March 1, 1960
A. DE ANGELIS
2,926,381
OPHTHALMIC MOUNTINGS
Original Filed Dec. 15, 1951
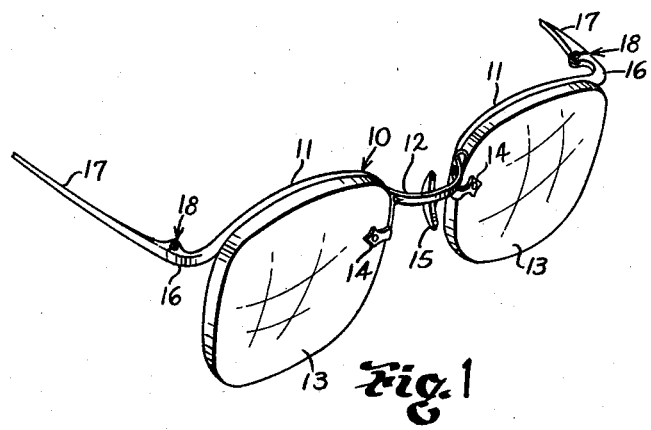
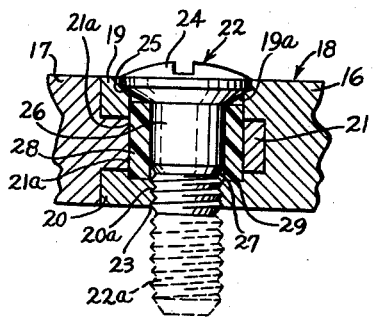
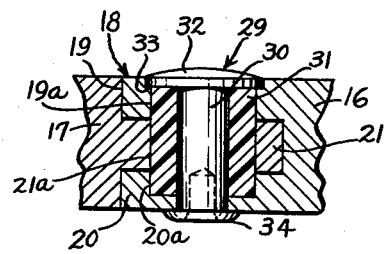
INVENTOR
ARMAND DeAngelis
BY
*Louis L. Gagnon*
ATTORNEY

2,926,381

OPHTHALMIC MOUNTINGS

Armand De Angelis, Southbridge, Mass., assignor to American Optical Company, Southbridge, Mass., a voluntary association of Massachusetts Original application December 15, 1951, Serial No. 261,795, now Patent No. 2,828,668, dated April 1, 1958. Divided and this application September 30, 1957, Serial No. 687,012

4 Claims. (Cl. 16—140)

This invention relates to improvements in ophthalmic mountings and has particular reference to novel hinge means for connecting temples to the supporting frames of ophthalmic mountings and method of making same.

The instant application is a division of the inventor's co-pending patent application filed December 15, 1951 and bearing Serial Number 261,795, and now Patent No. 2,828,668, issued April 1, 1958.

One of the primary objects of this invention is to provide a novel, simple and inexpensive device and method of making the same for use in temple hinge connections of ophthalmic mountings whereby the temples will be more efficiently retained in desired adjusted open or spaced relation without undue "dropping" or binding.

Another object is to provide an ophthalmic mounting with a temple hinge connection wherein compressible means is mounted in encircling relation with the pivot member for aiding in frictionally retaining the temples in adjusted positions.

Another object is to provide a hinge connection of the above character wherein said compressible means is in the form of a nylon bushing which encircles the pivot member and, through its permanent inherent resiliency, frictionally grips the pivot member and prevents undesired free swinging movement of the temples on the hinges or binding thereof.

Further objects and advantages of the invention will become apparent from the following description taken in connection with the accompanying drawing, in which:

Fig. 1 is a perspective view of an ophthalmic mounting embodying the invention;

Figs. 2 and 3 are enlarged fragmentary vertical sectional views taken through the temple hinge connection of the mounting shown in Fig. 1 and illustrating the invention as applied to various temple hinge connections.

In the manufacture of ophthalmic mountings, it is desirable that the temple hinges be so constructed that the temples will not "drop"; that is, the temples, when opened or spread at any desired angle with respect to the plane of the lenses, will be retained in their adjusted positions and will not be free to swing on the hinges except when force is applied thereto. Also, it is desirable that the hinges be so constructed that the parts will not bind or "freeze" after considerable use.

Various means have been devised in attempting to overcome "dropping" of the temples and binding of the hinges including the provision of friction members, springs and other mechanical devices many of which are intricate and complicated and, consequently, difficult as well as expensive to manufacture.

Referring to the drawing wherein like characters of reference designate like parts throughout the several views, Fig. 1 illustrates one type of ophthalmic mounting which embodies the invention and which comprises a frame 10 which embodies a pair of spaced transverse arms 11 which are connected together by a bridge member 12, the arms 11 being elongated and shaped to the upper contour shape of spaced lenses 13. The lenses 13 are supported by strap members 14 which extend from the bridge 12. The entire mounting is adapted to be supported upon the nose of a wearer by means of nose pads 15 carried by guard arms (not shown) and which are attached to the mounting adjacent the bridge 12.

Each of the transversely extending arms 11 terminate in rearwardly directed endpieces 16 to which temples 17 are secured by hinges 18. The extreme end of each endpiece 16 is bifurcated to form a pair of spaced ears 19 and 20 which are adapted to receive therebetween an ear 21 provided on the adjacent end of the respective temple 17. The ears 19, 20 and 21 are each provided with concentric aligned openings 19a, 20a and 21a respectively therethrough for reception of a pivot member such as screw 22.

The screw 22 is provided with a threaded portion 23 adjacent one end thereof, which portion 23 is threadedly secured in the opening 20a in the lower ear 20 of the endpiece 16. The opposed end of the screw 22 is provided with a head 24 which is adapted to engage the upper surface of the upper ear 19 or more particularly, as is shown in Fig. 2, is positioned within a countersink 25 formed in said ear 19. Intermediate said threaded portion 23 and head 24 of the screw 22 is a shank portion 26 which is adapted to be positioned within the openings 19a and 21a in the ears 19 and 21. The shank portion 26 is of a diameter slightly larger than the diameter of the threaded portion 23 and is connected thereto by a tapered portion 27. The aligned openings 19a and 21a in the ears 19 and 21 are of a diameter greater than the diameter of the opening 20a in ear 20 and are adapted to receive therein a bushing 28, which bushing is adapted to encircle the shank portion 26 of the screw 22, as shown in Fig. 2. The shelf 29 thus formed in the ear 20 by the opening 20a therein serves to prevent retraction of the bushing 28 in a direction away from the head 24 of the screw 22, while the head 24 itself prevents retraction of the bushing 28 in the opposite direction.

The bushing 28 is formed of a compressible material characterized by its inherent resiliency and ability when deformed to tend to return to its initial size and shape, and is also characterized by its toughness and durability. Such a bushing is preferably formed of nylon but may be made of similar material having the desired characteristics.

The bushing 28 is provided with an outside diameter approximately the same as the diameter of the openings 19a and 21a in ears 19 and 21 and an inside diameter which is slightly smaller than the diameter of the shank portion 26 of the screw 22. In assembling the structure, the ears 19, 20 and 21 are positioned in such manner that the openings therethrough are aligned and the bushing 28 is then inserted therein. Following this, the screw having an intially long lead portion 22a is inserted and threaded into the opening 20a in ear 20 whereupon the tapered portion 27 will direct the shank portion 26 of the screw 22 into the bushing 28, forcibly compressing the bushing against the walls of the openings 19a and 21a whereupon the screw can be tightened down to a position where the head 24 is in engagement with the countersink 25. The exposed long lead portion 22a of the screw is then removed, as indicated by dotted lines in Fig. 2.

In such a construction, the inherent resiliency of the material of the bushing 28 creates sufficient friction upon the shank portion 26 of the screw to retain the temples in any desired adjusted angular position with respect to the plane of the lenses 13. Also, binding or "freezing" of the movable parts will not occur as sometimes is the case when hinges are formed entirely of engaging metal parts.

Although the endpiece 16 has been described as having spaced ears 19 and 20 between which the single ear 21 of the temple is positioned it is to be understood that the temple may be provided with spaced ears between which a single ear on the endpiece may be positioned or several interfitting ears may be formed on both the temple and endpiece. This applies to all structures shown and described herein.

Fig. 3 is generally similar to the arrangement shown in Fig. 2 with the exception that instead of a screw, the hinge pivot member 29 consists of a solid headed metallic stud having a shank portion 30 which is adapted to be inserted into the bushing 31 of nylon or similar material, with its head portion 32 being subsequently located in a countersink 33 provided therefor in ear 19. The stud 29 is also provided with an outside diameter larger than the inside diameter of the bushing 31 and, therefore, in the assembled structure compresses the bushing 31, forcing it against the walls of the openings 19a, 21a and 20a to provide the desired frictional engagement.

The pivot member 29 is prevented from being retracted by means of a flange 34 formed on its opposed end by peening or the like after assembly.

In the embodiments of the invention shown in Figs. 2 and 3 the compressible bushing which encircles the pivot member will frictionally act to retain the temples in desired adjusted open or spaced relation with respect to the plane of the lenses without permitting undue "dropping" or binding.

From the foregoing it will be apparent that all of the objects and advantages of the invention have been accomplished. It will be apparent, however, that many changes may be made in the details of construction, arrangement of parts, and method shown and described without departing from the spirit of the invention as expressed in the accompanying claims. Therefore it is to be understood that all matter set forth or shown in the accompanying drawing is to be interpreted as illustrative and not in a limiting sense.

I claim:

1. A hinge connection for connecting a temple to a supporting part of an ophthalmic mounting, said hinge connection comprising a plurality of interfitting ears provided on the adjoining portions of said temple and supporting part having substantially aligned openings therein and a pivot member within the openings in said ears, the opening in one of said ears being threaded, said pivot member comprising a screw having a partially threaded body portion with the major area of the threaded part thereof in threaded relation with the threaded opening in said one of the ears and a resilient tubular friction member of nylon material tightly positioned in said unthreaded openings of the ears in closely encircling relation with at least all of the unthreaded portion of the body of said screw, said unthreaded portion of the body of the screw being of a diameter greater than the initial inner diameter of said friction member and said friction member being characterized by its resistance to wear and its inherent resiliency and ability to tend to return to its initial size and shape when altered therefrom whereby the body portion of said screw when said screw is tightened will be forced inwardly of said tubular friction member and will exert and retain a sidewise compressing force on said friction member to cause it to compress and to frictionally contact the inner surfaces of said unthreaded openings and the outer surface of said body portion of the screw by an amount sufficient to restrain the temples from undesired free swinging movement relative to the supporting part of the ophthalmic mounting and with the inherent tendency of the material of the friction member to return to its initial shape functioning to compensate for wear and to retain said frictional restraining action while preventing binding or freezing of the temple relative to its supporting part.

2. A hinge connection for connecting a temple to a supporting part of an ophthalmic mounting, said hinge connection comprising a plurality of interfitting ears provided on the adjoining portions of said temple and supporting part having substantially aligned apertures therein, the aperture in one of the outermost ears of said hinge connection having a counterbore therein and the aperture in the other of said outermost ears being threaded and of a smaller size than that of the apertures in the remaining ears, a pivot member within the apertures in said ears, said pivot member embodying a screw having an enlarged head part seated in said counterbore and a partially threaded body part extending through the apertures in said ears and threadedly engaged in said threaded aperture, a tubular friction member of plastic material of the type which is resilient and resistant to wear tightly positioned within the unthreaded apertures and in closely encircling relation with the body part of said screw, said tubular friction member extending between said outermost ear having the threaded aperture therein and the head part of said screw and said tubular friction member having a bore initially of a smaller inner diameter than the body part of said screw and an outer diameter of substantially the same diameter as the unthreaded apertures in said ears whereby said tubular friction member may be initially freely fitted inwardly of said apertures when assembled in said ears and the material of said friction member may be compressed between said unthreaded apertures and the body part of said screw when said screw is thereafter tightened to force the body part thereof inwardly of the bore and cause the material of said friction member to exert a frictional holding force on the movable parts of said hinge connection and yieldably restrain the temples from undesired free swinging movement relative to the supporting part of the ophthalmic mounting while preventing binding or freezing of the temple relative to its supporting part.

3. A hinge connection for connecting a temple to a supporting part of an ophthalmic mounting, said hinge connection comprising a plurality of interfitting ears provided on the adjoining portions of said temple and supporting part having substantially aligned apertures therein, the apertures in one of the outermost ears of said hinge connection having a counterbore therein and the aperture in the other of said outermost ears being threaded and of a smaller size than that of the apertures in the remaining ears, a pivot member within the apertures in said ears, said pivot member embodying a screw having an enlarged head part seated in said counterbore and a partially threaded body part extending through the apertures in said ears and threadedly engaged in said threaded aperture, a cylindrically shaped tubular friction member of plastic material characterized by its resistance to wear and its inherent resiliency and ability to tend to return to its initial size and shape when altered therefrom tightly positioned within the unthreaded apertures and in closely encircling relation with the body part of said screw, said friction member extending between said outermost ear having the threaded aperture therein and the head part of said screw and said tubular friction member having a bore initially of a smaller inner diameter than the body part of said screw and an outer diameter of substantially the same diameter as the unthreaded apertures in said ears whereby said tubular friction member may be initially freely fitted inwardly of said apertures when assembled in said ears and the material of said friction member may be compressed between said unthreaded apertures and the body part of said screw when said screw is thereafter tightened to force the body part thereof inwardly of the bore and cause the material of said friction member to exert a frictional holding force on the movable parts of said hinge connection and yieldably restrain the temples from undesired free swinging movement relative to the supporting part of the ophthalmic mounting while preventing binding or freezing of the temple relative to its supporting part.

4. A hinge connection for connecting a temple to a supporting part of an ophthalmic mounting, said hinge connection comprising a plurality of interfitting ears provided on the adjoining portions of said temple and supporting part having substantially aligned apertures therein, the apertures in one of the outermost ears of said hinge connection having a counterbore therein and the aperture in the other of said outermost ears being threaded and of a smaller size than that of the apertures in the remaining ears, a pivot member within the apertures in said ears, said pivot member embodying a screw having an enlarged head part seated in said counterbore and a partially threaded body part extending through the apertures in said ears and threadedly engaged in said threaded aperture, a tubular friction member of nylon material characterized by its resistance to wear and its inherent resiliency and ability to tend to return to its initial size and shape when altered therefrom tightly positioned within the unthreaded apertures and in closely encircling relation with the body part of said screw, said friction member extending between said outermost ear having the threaded aperture therein and the head part of said screw and said tubular friction member having a bore initially of a smaller inner diameter than the body part of said screw and an outer diameter of substantially the same diameter as the unthreaded apertures in said ears whereby said tubular friction member may be initially freely fitted inwardly of said apertures when assembled in said ears, the body portion of said screw when said screw is thereafter tightened to force the body part thereof inwardly of the bore will exert and retain a sidewise compressing force on said friction member to cause it to compress and to frictionally contact the inner surfaces of said unthreaded openings and the outer surface of said body portion of the screw by an amount sufficient to restrain the temples from undesired free swinging movement relative to the supporting part of the ophthalmic mounting and with the inherent tendency of the material of the friction member to return to its initial shape functioning to compensate for wear and to retain said frictional restraining action with substantially no binding or freezing of the movable parts of the hinge connection.

References Cited in the file of this patent
UNITED STATES PATENTS

| | | |
|---|---|---|
| 618,118 | Moews | Jan. 24, 1899 |
| 1,069,209 | Wambsgans | Aug. 5, 1913 |

FOREIGN PATENTS

| | | |
|---|---|---|
| 103,617 | Sweden | Jan. 27, 1942 |